United States Patent [19]

Bashaw

[11] Patent Number: 4,582,604

[45] Date of Patent: Apr. 15, 1986

[54] SKIMMING APPARATUS

[76] Inventor: Gary F. Bashaw, 3174 Lancaster, Sterling Heights, Mich. 48077

[21] Appl. No.: 606,906

[22] Filed: May 4, 1984

[51] Int. Cl.4 .......................................... B01D 17/022
[52] U.S. Cl. .................................. 210/396; 210/400; 210/924
[58] Field of Search ............... 210/671, 924, 350, 396, 210/400, 407

[56] References Cited

U.S. PATENT DOCUMENTS

| 3,508,663 | 4/1970 | Brill | 210/924 X |
| 3,709,369 | 1/1973 | Brill et al. | 210/924 X |
| 3,915,859 | 10/1975 | Sundin et al. | 210/924 X |

Primary Examiner—Thomas Wyse
Attorney, Agent, or Firm—Remy J. VanOphem

[57] ABSTRACT

A portable, self-contained skimming apparatus having a rotatable drive wheel and a rotatable idler star wheel disposed in a spaced apart relationship. An endless belt is extended over the rotatable drive wheel and the rotatable idler star wheel, a portion of the endless belt descends downwardly into the liquid to be skimmed. One or more scraping devices are provided between the rotatable idler wheel and the rotatable drive wheel for removing fluid from the endless belt. A pressure roller is provided to bias a portion of the endless belt into engagement with the rotatable drive wheel so that the rotatable drive wheel may drive the endless belt. A collector is provided below the one or more scraping devices so as to collect fluid removed from the endless belt.

21 Claims, 3 Drawing Figures

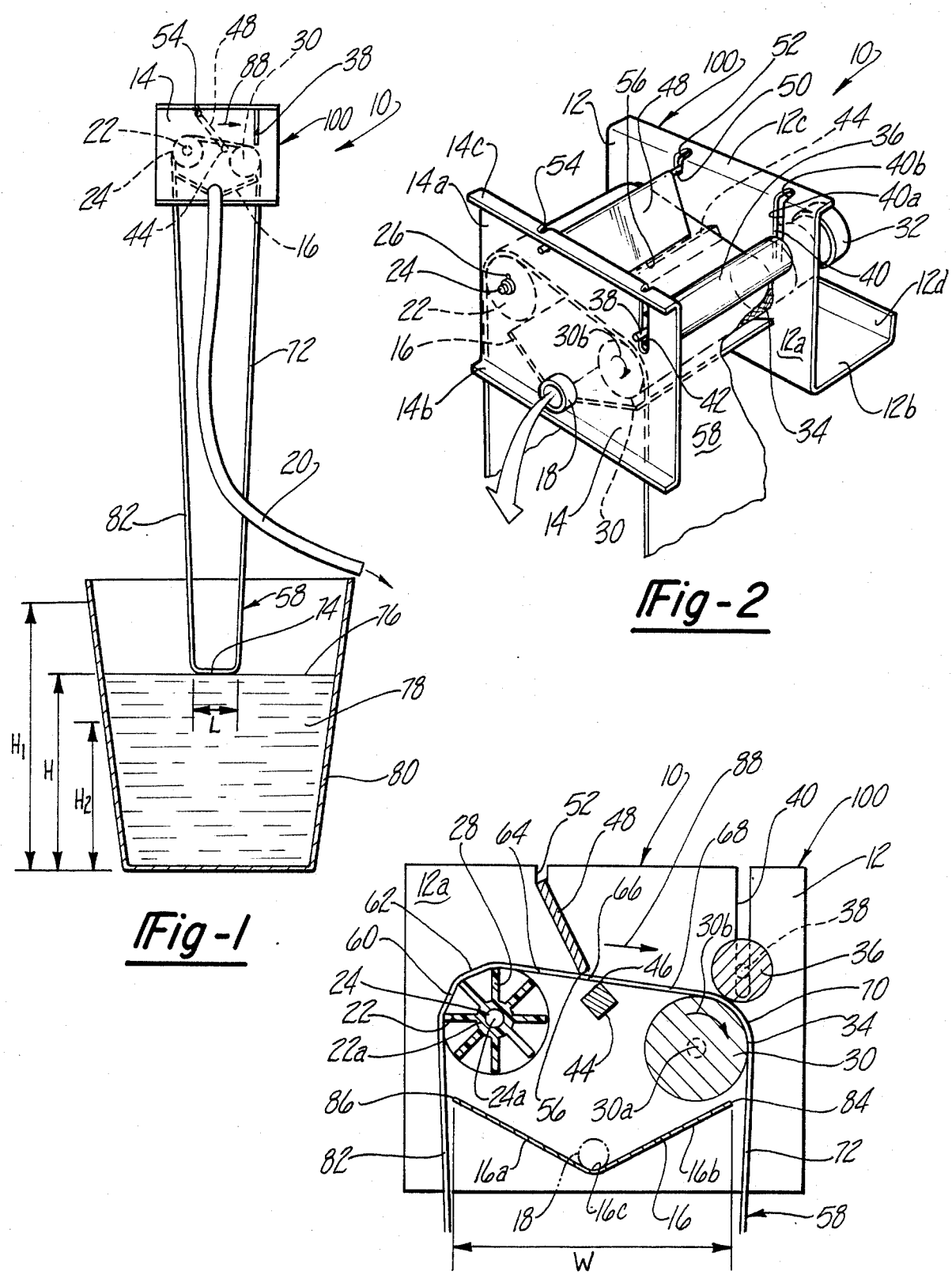

SKIMMING APPARATUS

BACKGROUND OF THE INVENTION

The present invention relates to a device for separating a first liquid from a second liquid on which the first liquid is floating and, more particularly, to a skimming apparatus using a continuous flexible belt having an outer surface preferentially wettable by the first liquid.

Devices are well known for removing a first liquid, which is floating on the surface of a second liquid, from the second liquid. Such devices are used, for example, to reclaim oil from a mixture of oil or water. Alternatively, they are used to remove contaminants, including solid contaminants, from water which is to be reused. In either case, the device typically includes a belt or wheel having a surface preferentially wettable by the first liquid. One portion of the wheel or belt is typically disposed within the tank while the other portion is disposed remote from the tank. Various means are provided for removing the first liquid from the preferentially wettable surface.

For example, in Yahnke, U.S. Pat. No. 3,578,585, issued May 11, 1971, a porous polyurethane wheel is partially disposed within a tank containing water and is rotated about an axis disposed approximately at the surface level of the water. A roller is biased against a portion of the surface of the wheel disposed above the surface of the water so as to squeeze the oil drawn into the pores of the porous polyurethane wheel. The oil is then collected in a pan disposed below the roller.

A similar device is disclosed in U.S. Pat. No. 4,097,379, issued June 27, 1978 to Shelstad. In Shelstad, a porous drum is submerged in a tank of reclaimed water from a car wash installation. The porous drum is used as a filter to filter undesirable debris from the reclaimed wash water, which passes from the exterior to the interior of the drum. A roller is biased against an exterior surface portion of the drum, external of the tank, to squeeze the debris from the surface of the drum. The debris is collected in a tray disposed adjacent the roller. The tray is also provided with a scraping surface abutting a portion of the surface of the drum, to squeeze some of the surface water from the drum without removing the debris therefrom. The surface water removed by the scraper is permitted to flow back into the tank.

In U.S. Pat. No. 3,617,552, issued to Will on Nov. 2, 1971, an endless belt, formed of a series of layers of porous materials, is used to remove oil from a body of water. The endless belt is wound about exactly two spaced apart wheels. A front wheel is disposed below the surface of the body of water, while a second wheel is disposed above the surface of the body of water and to one side of the first wheel so that the portion of the endless belt which is being drawn out of the body of water is disposed at an angle of more than 90° relative to the surface of the water, such as to facilitate the recovery of oil from the surface of the water. Furthermore, the water moves past the endless belt, or the endless belt is mounted so as to move through the body of water, to further facilitate recovery of the oil from the surface of the water. Two rollers are provided to twice squeeze the portion of the endless belt extended about the second wheel. The first roller gently squeezes the endless belt to remove water, the removed water being redirected downwardly into the body of water from which the oil is being removed. The second roller squeezes the belt vigorously to remove oil which is collected in a pan disposed below the second roller.

Still another device for separating oil from water using an endless belt is disclosed in Koller, U.S. Pat. No. 4,274,957 issued June 23, 1981. In Koller, a drive wheel is rotatably mounted in a housing disposed above the surface of a body of water containing surface oil. An endless belt, having a surface preferentially wettable by oil, is extended about the drive wheel and decends downwardly therefrom into the body of water. An idler roller is fitted to the lowermost end of the endless belt so as to maintain the endless belt in tension and to locate it directly under the housing. A pressure roller is rotatably and movably mounted to the housing at a location above the drive wheel so as to be biased downwardly by gravity against the drive wheel. The endless belt is thereby squeezed between the pressure roller and the drive wheel to squeeze oil removed from the tank by the endless belt from the body of water. The pressure roller is intentionally offset relative to the drive wheel so as to create a small trough of oil therebetween. The endless belt is designed to be substantially narrower than the drive wheel so that the oil may descend into a tray disposed below the drive wheel.

Each of the above described devices have certain advantages and certain disadvantages for various applications. For example, while Will removes a substantial amount of oil from water at a comparatively rapid rate, it is a rather complex and large device and is, therefore, inappropriate for many applications involving small tanks. Similarly, while Koller provides a comparatively compact device, a substantial amount of operating time is required to remove a significant amount of oil from water using the device disclosed or taught thereby. While the remaining above described devices may work well for the purposes for which they were designed, none of these other prior devices function well for removing oil, for reclamation purposes, from the surface of a body of water.

What is needed, therefore, is a lightweight, but efficient, oil skimmer for removing oil or other lightweight liquid contaminants from the surface of a body of water.

SUMMARY OF THE INVENTION

The present invention provides a lightweight, compact, efficient, and inexpensive skimming apparatus for removing and recovering a first liquid from a second liquid on which it is floating.

The skimming apparatus of the present invention includes a drive wheel, mounted for rotation about a first substantially horizontal axis, and an idler wheel, mounted for rotation about a second substantially horizontal axis parallel to the first substantially horizontal axis and spaced a predetermined distance therefrom. The drive wheel and the idler wheel are disposed above the surface of a body of liquid containing the first and second liquids wherein the first liquid is floating on the second liquid. An endless belt, having an outer surface preferentially wettable by the first liquid, is extended over the idler wheel and the drive wheel such as to have a first portion extended over the idler wheel, a second portion extended between an upper portion of the idler wheel and an upper portion of the drive wheel, a third portion extended about the drive wheel, and a fourth portion extended downwardly from the idler wheel and the drive wheel toward the body of liquid. A fifth portion of the endless belt rests on the surface of the body of liquid such as to absorb a portion of the first liquid, while a sixth portion extends upwardly from the body of liquid to the idler wheel. A scraping apparatus is provided between the drive wheel and the idler wheel to scrape the first liquid from the second portion of the endless belt. A collector is provided therebelow to collect the first liquid. Thus, when the drive wheel is rotatably driven in a direction such as to draw the second portion of the endless belt toward the drive wheel, a portion of the first liquid is drawn into the endless belt and is subsequently delivered to the scraping apparatus where it is removed and allowed to descend into the collector.

In the preferred embodiment of the present invention, a frame assembly consisting of a right side frame and a left side frame, is provided, the drive wheel, the idler wheel, the scraping apparatus, and the collector being mounted therebetween. Furthermore, in the preferred embodiment, the idler wheel used is a star wheel so as to minimize the amount of fluid removed from the endless belt by the idler wheel. The endless belt is preferably of substantially the same width as the drive wheel so as to maximize the amount of oil which may be removed by the skimming apparatus.

A roller is preferably, rotatably and movably mounted above the drive wheel so as to be biased at least partially by gravity against the drive wheel. The roller serves the purpose of maintaining the endless belt in engagement with the drive wheel. Additionally, the roller squeezes the third portion of the endless belt so as to remove an additional portion of the first liquid therefrom, the additional portion of the first liquid removed therefrom flowing downwardly into the collector by gravity.

Moreover, in the preferred embodiment, the scraping apparatus consists of a first scraper fixedly mounted between the right and left side frames of the frame assembly at a location parallel to and intermediate the drive wheel and the star wheel. A first scraping edge of the first scraper extends upwardly above the line of tangency extending between the upper portions of the drive wheel and the star wheel so as to engage a portion of the inner surface of the second portion of the endless belt. The second scraper consists of a plate pivotally mounted between the right and left side frames of the frame assembly. The second scraper is provided with a second scraping edge resting against the outer surface of the second portion of the endless belt. The second scraper is biased into engageaent with the endless belt by gravity.

It is, therefore, a primary object of the present invention to provide a lightweight, efficient, inexpensive, and compact skimming apparatus for removing a first liquid from a second liquid.

Another object of the present invention is to provide such a skimming apparatus which is particularly well suited for the efficient renoval of oil from the surface of water.

Yet another object of the present invention is to provide a lightweight skimming apparatus using an endless belt wherein the endless belt may be easily and rapidly changed, when necessary.

It is still another object of the present invention to provide a skimming apparatus for removing a first liquid from a second liquid having a frame of inexpensive construction and which is easily mountable adjacent a tank.

It is yet another object of the present invention to provide a skimming apparatus for removing a first liquid from a second liquid using an endless belt, wherein the skimming apparatus automatically compensates for changes in the depth of liquid and in the tension in the endless belt.

These and the many other objects, features, and advantages of the present invention will become apparent to those skilled in the art when the following detailed description of the preferred embodiment is read in conjunction with the drawings appended hereto.

BRIEF DESCRIPTION OF THE DRAWING

In the drawings appended hereto, wherein like reference numerals refer to like components throughout:

FIG. 1 is a side view with parts cut away of the tank containing a first liquid floating on a second liquid and an example of a skimming apparatus according to the present invention in operation for removing the first liquid from the second liquid;

FIG. 2 is a perspective view of the skimming apapratus of FIG. 1 with a portion of the endless belt thereof cut away; and FIG. 3 is a partial sectional view taken transversely through the skimming apparatus of FIG. 1.

DETAILED DESCRIPTION OF THE PREFERRED EMBODIMENTS

Referring now to the drawing, an example of a skimming apparatus for separating a first liquid from a second liquid according to the present invention is illustrated. In the example illustrated, the skimming apparatus is an oil skimmer 10 for separating oil from water. However, as will be appreciated by those skilled in the art, the present invention may be modified for use in separating other liquids.

As best shown in FIG. 2, the oil skimmer 10 has a frame assembly 100 consisting of a right side frame 12, and a left side frame 14, each formed from sheet metal stamping. The right side frame 12 includes a right vertical wall portion 12a and a horizontal base portion 12b extending normally therefrom. The horizontal base portion 12b is provided for mounting the right side frame 12, and thereby the oil skimmer 10, to any appropriate member, when the oil skimmer 10 is in use. The horizontal base portion 12b is susceptible to interconnection, for example, to a convenient table top by means of bolts or C-clamps, not illustrated in the drawing. The right side frame 12 is also provided with flanges 12c and 12d extending normally, respectively, from the right vertical wall portion 12a and the horizontal base portion 12b to provide strength and rigidity to the right side frame 12. The left side frame 14 includes a left vertical wall portion 14a disposed parallel to and spaced a predetermined distance away from the right vertical wall portion 12a and the right side frame 12. The left side frame 14 is also provided with flanges 14b and 14c depending normally from the left vertical wall portion 14a to provide strength and rigidity thereto.

The frame assembly 100 further includes a drip pan 16 provided between the right and left side frames 12 and 14. The drip pan 16 is interconnected with the right and left vertical wall portions 12a and 14a thereof by appropriate means, such as welds, not shown in the drawings. The drip pan 16 is also a sheet metal member which has been stamped, as shown in FIG. 3, to form two sloped wall portions 16a and 16b, each extending angularly upwardly from a vertex edge 16c. The drip pan 16 acts as a collector for oil retrieved by the oil skimmer 10, in a manner to be described later. As shown in FIG. 2, the left vertical wall portion 14a of the left side frame 14 is provided with an outlet 18 disposed adjacent the vertex edge 16c of the drip pan 16. A fluid line 20, shown only in FIG. 1, is interconnected with the outlet 18 so as to direct any oil collected on the drip pan 16 to a predetermined location, such as an oil can, not illustrated in the drawing.

As shown generally in FIGS. 1 and 2, a star wheel 22 is rotatably mounted on an axle 24 extending between the right vertical wall portion 12a of the right side frame 12, and the left vertical wall portion 14a of the left side frame 14. As shown in FIG. 2, one end of the axle 24 extends through a suitable aperture in the left vertical wall portion 14a and is secured by means of a cotter pin 26. The other end of the axle 24, not shown in the drawing, is interconnected with the right vertical wall portion 12a in a similar manner. The star wheel 22, as best shown in FIG. 3, has a central hub portion 22a and a plurality of rectangular paddles or blades 28 extending radially outwardly therefrom for a purpose to be described later. The star wheel 22 rotates about a first predetermined axis 24a defined by the axle 24, the first predetermined axis being approximately horizontal.

As indicated generally in the drawing, a drive wheel 30 is also rotatably mounted to the frame assembly 100 between the right vertical wall portion 12a of the right side frame 12, and the left vertical wall portion 14a of the left side frame 14. The drive wheel 30 is rotatably interconnected by appropriate means, not shown, with the right and left side frames 12 and 14 such as to rotate about a second predetermined longitudinal axis 30a, shown only in FIG. 3. The second predetermined longitudinal axis 30a is disposed parallel to the first predetermined axis 24a and spaced a predetermined distance away therefrom. A motor 32, illustrated in FIG. 2, is ounted to the right vertical wall portion 12a of the right side frame 12, in a manner well known in the art, and is operatively interconnected with the drive wheel 30 such as to rotatably drive the drive wheel 30 to rotate about the second predetermined longitudinal axis 30a in the direction indicated by the arrow 30b. The drive wheel 30 is provided with a knurled surface 34 on the outer periphery thereof.

A pressure roller 36, fixedly mounted on an axle 38, is movably and rotatably interconnected with the frame assembly 100 of the oil skimmer 10 in a location adjacent the drive wheel 30. More particularly, as best shown in FIG. 2, a slot 40 is provided in the guide in the right side frame 12, having a guide portion 40a formed in the right vertical wall portion 12a of the right side frame 12, and a clearance portion 40b formed in the flange 12c thereof. A similar slot 42 is formed in the left side frame 14. The slots 40 and 42 accept therein the ends of the axle 38 of the pressure roller 36, and together define a vertical guide path for the pressure roller 36, while permitting rotation of the pressure roller 36. The slots 40 and 42 are offset from the second predetermined longitudinal axis 30a of the drive wheel 30, in the direction away from the first predetermined longitudinal axis 24a, for a purpose that will become apparent later.

An elongated block 44 is fixedly interconnected with the frame assembly 100 of the oil skimmer 10 at a location between the star wheel 22 and the drive wheel 30 by being fixedly interconnected at each of its ends with one of the right and left side frames 12 and 14. The elongated block 44 acts as a first scraper and is provided, as indicated in FIG. 3, with a first scraping edge 46 which is upwardly oriented and extends above the line of tangency between the upper portions of the star wheel 22 and the drive wheel 30.

A wiper plate 48 is pivotally mounted between the right side frame 12 and the left side frame 14 of the frame assembly 100, as shown in FIG. 2, by means of an axle 50 integrally formed at one edge of the wiper plate 48. The opposite ends of the axle 50 are respectively engageable in slots 52 and 54 formed, respectively, in the right and left side frames 12 and 14 similar to the slots 40 and 42 described above. A second scraping edge 56 is forced in the wiper plate 48 opposite the axle 50, as shown in FIG. 3. The second scraping edge 56 is biased downwardly relative to the axle 50 by gravity to extend below the line of tangency between the upper portions of the star wheel 22 and the drive wheel 30. Preferably, the second scraping edge 56 of the wiper plate 48 is positioned such as to be disposed between the star wheel 22 and the first scraping edge 46 of the elongated block 44.

An endless belt 58, shown generally in the drawing, is removably mounted to the oil skimmer 10 by temporarily removing the pressure roller 36 and the wiper plate 48 from the frame assembly 100. The endless belt 58 is fitted over one of the right or left side frames 12 or 14 and permitted to rest upon the star wheel 22, the elongated block 44, and the drive wheel 30. Once the endless belt 58 is mounted to the oil skimmer 10, the pressure roller 36 and the wiper plate 48 are remounted between the right and left side frames 12 and 14. The second scraping edge 56 of the wiper plate 48 is biased angularly upwardly by the endless belt 58.

Accordingly, as shown in FIG. 3, the endless belt 58 has portions 60 and 62 extended between several of the rectangular blades 28 of the star wheel 22. A portion 64 of the endless belt 58 adjacent to the portion 62 thereof extends from the star wheel 22 to a position below the second scraping edge 56 of the wiper plate 48. A portion 66 of the endless belt 58 extends from the second scraping edge 56 of the wiper plate 48 to the first scraping edge 46 of the elongated block 44 while another portion 68 of the endless belt 58 extends from the first scraping edge 46 of the elongated block 44 to the drive wheel 30. A portion 70 of the endless belt 58 extends partially around the drive wheel 30 and is pressed thereagainst by the pressure roller 36. Yet another portion 72 of the endless belt 58 extends downwardly from the drive wheel 30, as best shown in FIG. 1. A portion 74 of the endless belt 58 adjacent the portion 72 is floated on the surface 76 of a body of liquid 78 in a vessel 80. In the preferred embodiment, the principal liquid in the body of liquid 78 is water while the surface 76 of the liquid contains oil. Finally, a portion 82 of the endless belt 58 extends from the portion 74 of the endless belt 58 floating on the surface 76 of the body of liquid 78 upwardly toward the star wheel 22.

It should be noted that the length L of the portion 74 of the endless belt 58 which is floating on the surface 76 of the body of liquid 78 will vary depending on the position of the frame assembly 100 of the oil skimmer 10 relative to the surface 76 and further will vary depending on the height H of the surface. No adjustment of the endless belt 58 is required as the water level changes. Furthermore, regardless of the height H of the water in the vessel 80, a substantial portion of the endless belt 58 will be in contact with the oil floating on the surface 76 thereof.

It should further be noted that the width W, shown in FIG. 3, of the drip pan 16 should be preselected such as to avoid engagement of the respective edges 84 and 86 of the sloped wall portions 16a and 16b with the adjacent portions 72 and 82 of the endless belt 58, even when the length L of the portion 74 of the endless belt 58 is extremely small, to insure continued proper operation of the oil skimmer 10 under these circumstances.

The operation of the oil skimmer 10 may now be understood. The motor 32 is operated so as to rotate the drive wheel 30 in the direction indicated by the arrow 30b. The pressure roller 36 exerts pressure on the portion 70 of the endless belt 58 disposed about the drive wheel 30 such as to maintain the drive wheel 30 in driving engagement with the endless belt 58. The knurled surface 34 of the drive wheel 30 further facilitates the driving engagement therebetween. The drive wheel 30 drives the endless belt 58 to move in the direction indicated by the arrow 88 in FIGS. 1 and 3. As the endless belt 58 is moved, the portion 74, resting on the surface 76 of the body of liquid 78, absorbs a portion of the oil floating on the surface. The endless belt 58 is then drawn upwardly from the surface 76 of the body of liquid 78 over the star wheel 22 to transfer the endless belt from a vertical direction to a horizontal direction without stripping the oil from the underside of the endless belt.

In the horizontal position, the endless belt 58 is pulled under the second scraping edge 56 of the wiper plate 48 to strip oil from the outer surface of the endless belt. The oil beads up in front of the second scraping edge 56 and drains across the portion 64 of the endless belt 58 to the edges of the endless belt and falls off of the endless belt into the drip pan 16. The endless belt 58 is then drawn from the second scraping edge 56 of the wiper plate 48 to the first scraping edge 46 of the elongated block 44 to scrape oil from the inner surface of the endless belt, the oil scraped thereby rolling down the sides of the elongated block 44, and dripping into the drip pan 16.

While a substantial portion of the oil on the endless belt 58 is removed by the wiper plate 48 and the elongated block 44, the portion 68 of the endless belt 58 between the elongated block 44 and the drive wheel 30 still retains a small portion of oil. The remaining oil is removed from the endless belt 58 by the pressure roller 36. The weight of the pressure roller 36 exerts a sufficient force on the portion 70 of the endless belt 58, which extends around the drive wheel 30, to prevent the remaining oil on the endless belt surface from passing between the pressure roller and the drive wheel. The oil squeezed from the portion 70 of the endless belt 58 flows downwardly into the drip pan 16. The descent of the oil from the portion 70 of the endless belt 58 into the drip pan 16 is facilitated by providing for the line of tangency between the star wheel 22 and the drive wheel 30 to extend angularly downwardly toward the drive wheel, as will be apparent to those skilled in the art. The endless belt 58 thereafter descends, as shown in FIG. 1, into the vessel 80 to recover an additional quantity of oil. The oil which has been collected in the drip pan 16 descends into the vertex edge 16c thereof and outwardly, through the outlet 18 and the fluid line 20, to a collection tank, not illustrated in the drawing.

The oil skimmer 10 of the present invention operates extremely efficiently. The portion 74 of the endless belt 58 lays on the liquid surface, partially submerged, to thereby allow oil to collect on both sides of the endless belt. The endless belt 58 automatically adjusts to the fluid level within a range determined by the overall belt length and the width of the vessel. At a predetermined maximum height $H_1$, of the body of liquid 78 in the vessel 80, the endless belt 58 will have the maximum floating square surface area to collect oil or other contaminants. As the liquid level drops, the length L of the endless belt 58 floating on the surface 76 of the body of liquid 78 will decrease, but a portion of the endless belt will remain in contact with the surface until the liquid level has dropped below a predetermined minimum height $H_2$, exceeding the reach of the endless belt.

The oil and other contaminants which have been efficiently retrieved by the endless belt 58 are efficiently recovered from the endless belt by the oil skimmer 10 as a result of the combined oil and contaminant removal actions of the wiper plate 48, the elongated block 44, and the pressure roller 36. Furthermore, the star wheel 22 transfers the endless belt 58 to the vicinity of these elements without removing any of the oil or contaminants from the endless belt.

It will further be appreciated that the oil skimmer 10 has an extremely lightweight construction resulting from the use of three sheet metal members; the right side frame 12, the left side frame 14, and the drip pan 16, which provide the entire frame assembly 100 of the oil skimmer 10. Furthermore, the endless belt 58 of the oil skimmer 10 may be rapidly changed by the easy temporary removal of the wiper plate 48 and the pressure roller 36 from the frame assembly 100.

It will be readily apparent to those skilled in the art that many variations and modifications may be made from the above described example of structure for an oil skimmer 10. Such variations and modifications are included within the intended scope of the claims appended hereto.

What is claimed as novel is as follows:

1. A skimming apparatus for removing a first liquid from a second liquid on which said first liquid is floating, said skimming apparatus comprising:

a drive wheel mounted for rotation about a first substantially horizontal axis;

an idler wheel mounted for rotation about a second substantially horizontal axis, said second substantially horizontal axis being parallel to said first substantially horizontal axis and spaced a predetermined distance therefrom, said idler wheel having a hub and a plurality of blade members extending radially from said hub;

an endless belt having a surface preferentially wettable by said first liquid, said endless belt having a first portion extending over an upper portion of said idler wheel, a second portion extending from said upper portion of said idler wheel to an upper portion of said drive wheel, a third portion extending over said upper portion of said drive wheel, a fourth portion depending downwardly from said upper portion of said drive wheel toward said first liquid, a fifth portion disposed in said first liquid, and a sixth portion extending upwardly from said first liquid to said idler wheel;

biasing means for biasing said third portion of said endless belt into driving engagement with said drive wheel;

scraper means mounted at a predetermined location between said drive wheel and said idler wheel, said scraper means scraping said first liquid from said endless belt as said second portion of said endless belt is pulled past said scraper means; and collector means mounted below said scraper means extending beneath said idler wheel, said second portion of said endless belt, and said drive wheel, said collector means collecting said first liquid which flows downwardly from said first, second, and third portions of said endless belt.

2. The skimming apparatus of claim 1 wherein the width of said drive wheel and the width of said idler wheel are substantially identical.

3. The skimming apparatus of claim 1 wherein the width of said endless belt is substantially identical to the width of said drive wheel.

4. The skimming apparatus of claim 1 wherein said biasing means comprises a pressure roller mounted adjacent said drive wheel and parallel thereto, said pressure roller being biased against said drive wheel such as to bias said third portion of said endless belt into engagement with said drive wheel.

5. The skimming apparatus of claim 4 wherein said pressure roller is disposed above said drive wheel and partially to the side of said drive wheel remote from said scraper means, such that said pressure roller is biased against said drive wheel, at least partially, by the weight of said pressure roller.

6. The skimming apparatus of claim 4 wherein said pressure roller is mounted above said drive wheel and exerts a sufficient force against said third portion of said endless belt such as to squeeze an additional portion of said first liquid from said third portion of said endless belt, said collector means being disposed partially below said drive wheel for collection of said additional portion of said first liquid.

7. The skimming apparatus of claim 1 wherein said second portion of said endless belt extends angularly downwardly from said upper portion of said idler wheel to said upper portion of said drive wheel.

8. The skimming apparatus of claim 1 further comprising drive means operatively interconnected with said drive wheel such as to rotate said drive wheel to advance said endless belt and such as to draw said second portion of said endless belt toward said drive wheel.

9. The skimming apparatus of claim 1 further comprising frame means, said drive wheel and said idler wheel being rotatably mounted to said frame means.

10. The skimming apparatus of claim 9 wherein said frame means further comprises:
a first flat frame member; and
a second flat frame member disposed parallel to said first flat frame member and spaced a predetermined distance therefrom, said drive wheel, said idler wheel, said scraper means, and said collector means being mounted between said first and second flat frame members.

11. The skimming apparatus of claim 1 wherein said drive wheel has a knurled surface.

12. The skimming apparatus of claim 1 wherein said scraper means comprises a wiper plate fixedly disposed relative to said first and second substantially horizontal axes.

13. The skimming apparatus of claim 12 wherein said wiper plate is movably disposed relative to said first and second substantially horizontal axes and is biased against said endless belt.

14. The skimming apparatus of claim 12 wherein said scraper means comprises:
fixed blade means fixedly disposed relative to said first and second substantially horizontal axes; and
movable blade means movably disposed relative to said first and second substantially horizontal axes and biased against said endless belt, said movable blade means being disposed remote from said fixed blade means.

15. The skimming apparatus of claim 14 wherein said fixed blade means is disposed below said second portion of said endless belt and said movable blade means is disposed above said second portion of said endless belt.

16. The skimming apparatus of claim 14 wherein said movable blade means is disposed between said idler wheel and said fixed blade means.

17. The skimming apparatus of claim 14 wherein said movable blade means is pivotally mounted such as to be biased downwardly by gravity.

18. A skimming apparatus for removing a first liquid from a second liquid on which it is floating, said skimming apparatus comprising:
frame means;
a drive wheel mounted to said frame means for rotation about a first substantially horizontal axis;
a star wheel mounted to said frame means for rotation about a second substantially horizontal axis, said second substantially horizontal axis being parallel to said first substantially horizontal axis and spaced a predeterminded distance therefrom;
an endless belt having a surface preferentially wettable by said first liquid, said endless belt having a first portion extending over an upper portion of said star wheel, a second portion extending from said upper portion of said star wheel to an upper portion of said drive wheel, a third portion extending over said upper portion of said drive wheel, a fourth portion depending downwardly from said upper portion of said drive wheel toward said first liquid, a fifth portion disposed in said first liquid, and a sixth portion extending upwardly from said first liquid toward said star wheel, said endless belt having a width substantially identical to the width of said drive wheel;
drive means mounted to said frame means and operatively interconnected with said drive wheel such as to rotate said drive wheel to advance said endless belt and such as to draw said second portion of said endless belt toward said drive wheel;
biasing means for biasing said third portion of said endless belt into driving engagement with said drive wheel;
scraper means mounted to said frame means at a predetermined location between said drive wheel and said star wheel, said scraper means engaging said second portion of said endless belt, said scraper means scraping said first liquid from said endless belt as said second portion of said endless belt is pulled past said scraper means by said drive wheel; and
collector means mounted below said scraper means and below said upper portion of said drive wheel and said star wheel, said collector means collecting said first liquid which flows downwardly from said first, second, and third portions of said endless belt.

19. The skimming apparatus of claim 18 wherein said biasing means comprises a pressure roller mounted adjacent said drive wheel, said pressure roller being biased against said drive wheel such as to maintain said third portion of said endless belt in engagement with said drive wheel and further, such as to exert a force on said third portion of said endless belt such as to squeeze an additional portion of said first liquid from said third portion of said endless belt.

20. The skimming apparatus of claim 18 wherein said scraper means further comprises:
fixed blade means fixedly interconnected with said frame means and disposed between said star wheel and said drive wheel such as to engage said third portion of said endless belt; and
movable blade means movably interconnected with said frame means, said movable blade means being disposed between said drive wheel and said star wheel and being in engagement with said second portion of said endless belt.

21. The skimming apparatus of claim 20 wherein said fixed blade means is disposed below said second portion of said endless belt and further, wherein said movable blade means is pivotally mounted to said frame means at a location above said second portion of said endless belt such as to be pivotable, by gravity, into engagement with said second portion of said endless belt, said movable blade means being disposed between said idler wheel and said fixed blade means.

* * * * *

UNITED STATES PATENT AND TRADEMARK OFFICE
CERTIFICATE OF CORRECTION

PATENT NO. : 4,582,604
DATED : April 15, 1986
INVENTOR(S) : Gary F. Bashaw

It is certified that error appears in the above-identified patent and that said Letters Patent is hereby corrected as shown below:

Column 3, line 58 delete "renoval" and insert ---- removal ----.

Signed and Sealed this

Thirtieth Day of September 1986

[SEAL]

Attest:

DONALD J. QUIGG

Attesting Officer

Commissioner of Patents and Trademarks